US008619660B2

(12) United States Patent
Takai et al.

(10) Patent No.: US 8,619,660 B2
(45) Date of Patent: Dec. 31, 2013

(54) MOBILE COMMUNICATION SYSTEM, COMMON CHANNEL TRANSMISSION CONTROL DEVICE, AND COMMON CHANNEL TRANSMISSION CONTROL METHOD USED IN THE SYSTEM AND DEVICE

(75) Inventors: Kenichi Takai, Tokyo (JP); Shuuzou Yanagi, Saitama (JP)

(73) Assignee: NEC Corporation, Tokyo (JP)

( * ) Notice: Subject to any disclaimer, the term of this patent is extended or adjusted under 35 U.S.C. 154(b) by 594 days.

(21) Appl. No.: 12/739,317

(22) PCT Filed: Oct. 21, 2008

(86) PCT No.: PCT/JP2008/069007
§ 371 (c)(1),
(2), (4) Date: Apr. 22, 2010

(87) PCT Pub. No.: WO2009/054362
PCT Pub. Date: Apr. 30, 2009

(65) Prior Publication Data
US 2010/0260056 A1    Oct. 14, 2010

(30) Foreign Application Priority Data
Oct. 24, 2007  (JP) ................................ 2007-275865

(51) Int. Cl.
*H04H 20/28* (2008.01)
*H04W 72/08* (2009.01)
*H04B 7/216* (2006.01)
*H04J 3/26* (2006.01)

(52) U.S. Cl.
USPC ........... 370/312; 370/329; 370/335; 370/342; 370/432; 370/252; 455/67.13; 455/452.2; 455/525

(58) Field of Classification Search
USPC ......... 370/252, 335, 328, 329–330, 312, 432, 370/336, 341, 342–343
See application file for complete search history.

(56) References Cited

U.S. PATENT DOCUMENTS 7,180,885 B2 * 2/2007 Terry ............................ 370/338
7,242,919 B2 * 7/2007 Kim et al. ..................... 455/313
(Continued)

FOREIGN PATENT DOCUMENTS

JP    2004-032211 A    1/2004
JP    2004-201095 A    7/2004
(Continued)

OTHER PUBLICATIONS

International Search Report for PCT/JP2008/069007, mailed Dec. 22, 2008.
European Search report for EP08842875 mailed on Nov. 29, 2012.

*Primary Examiner* — Candal Elpenord (57) ABSTRACT

A mobile communication system in which a number of common channels are added due to the offering of a new service includes: the assumption that a plurality of common channels can be arranged to transmit the same data, a monitor means that uses the reception path search results of either dedicated channels or random access channels of mobile stations to monitor the communication state of mobile stations within the cell and a control means that, when it is determined that distribution within the cell of mobile stations that receive the new service is unbalanced, effects control to divide and use the communication range permitted by a plurality of common channels.

13 Claims, 5 Drawing Sheets

(56) References Cited

U.S. PATENT DOCUMENTS

| | | | |
|---|---|---|---|
| 7,583,977 B2* | 9/2009 | Willenegger et al. | 455/522 |
| 7,606,206 B2* | 10/2009 | Yi et al. | 370/335 |
| 7,616,611 B2* | 11/2009 | Hwang et al. | 370/336 |
| 7,636,337 B2* | 12/2009 | Parantainen et al. | 370/336 |
| 7,684,358 B2* | 3/2010 | Kim et al. | 370/312 |
| 7,769,010 B2* | 8/2010 | Edlund et al. | 370/390 |
| 7,796,938 B2* | 9/2010 | Nishio et al. | 455/3.01 |
| 2003/0207696 A1* | 11/2003 | Willenegger et al. | 455/522 |
| 2005/0043033 A1 | 2/2005 | Fabien et al. | |
| 2006/0146745 A1* | 7/2006 | Cai et al. | 370/328 |
| 2006/0166690 A1* | 7/2006 | Nishio et al. | 455/522 |

FOREIGN PATENT DOCUMENTS

| | | |
|---|---|---|
| JP | 2004-215305 A | 7/2004 |
| JP | 2005-005781 A | 1/2005 |
| JP | 2006-524444 A | 10/2006 |
| WO | 2006/011347 A | 2/2006 |
| WO | 2007062576 A1 | 6/2007 |

* cited by examiner

MOBILE COMMUNICATION SYSTEM, COMMON CHANNEL TRANSMISSION CONTROL DEVICE, AND COMMON CHANNEL TRANSMISSION CONTROL METHOD USED IN THE SYSTEM AND DEVICE

TECHNICAL FIELD

The present invention relates to a mobile communication system, and more particularly to a common-channel transmission control method in a CDMA (Code Division Multiple Access) mobile communication system.

BACKGROUND ART

In a CDMA mobile communication system, common pilot channels that are transmitted from a base station to mobile stations (CPICH (Common Pilot Channels), P-CCPCH (Primary-Common Control Physical Channels), and S-CCPCH (Secondary-Common Control Physical Channels)) are controlled at a power that enables reception even by mobile stations located at a cell boundary.

Figure 1:
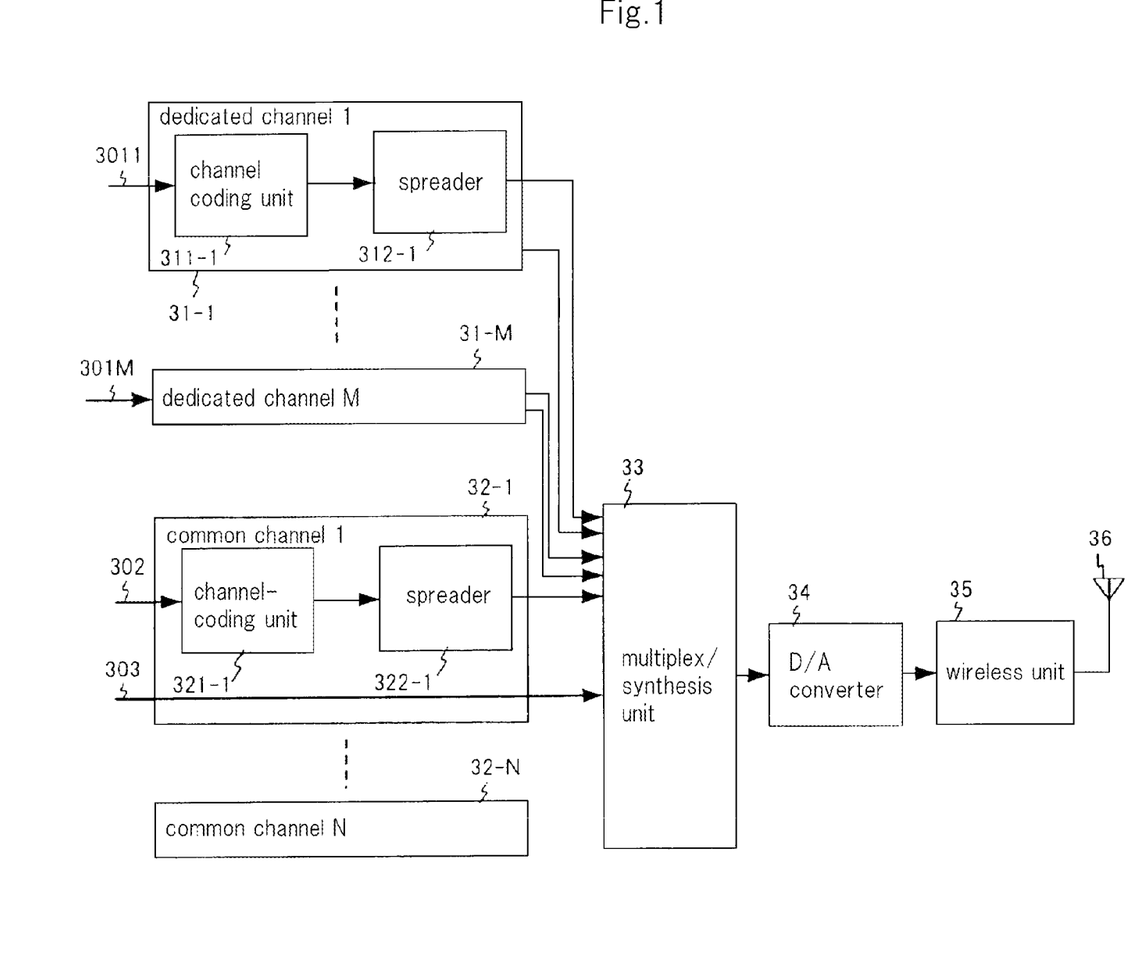
FIG. 1 is a block diagram showing the configuration of the transmitter of a CDMA base station device related to the present invention.

FIG. 1 shows the transmitter of a CDMA base station device that relates to the present invention. In FIG. 1, common-channel data 302 that are transmitted from a higher-order station (not shown) are applied as input to common-channel transmitter (common channel 1) 32-1.

In common-channel transmitter 32-1, channel coding unit 321-1 subjects common-channel data 302 to a bit coding process depending on the bit rate and data content to convert common-channel data 302 to a format for wireless transmission. After being converted to the wireless transmission format, common-channel data 302 are applied as input to spreader 322-1. Spreader 322-1 spreads the common-channel data that were supplied from channel coding unit 321-1 by a spreading code whose coding rate accords with the bit rate and supplies the spread data to multiplex/synthesis unit 33. The output of multiplex/synthesis unit 33 is supplied to antenna 36 by way of D/A converter 34 and wireless unit 35.

The transmitter of the CDMA base station device includes a plurality of common-channel transmitters 32-1-32-N for use by CPICH or P-CCPCH channels. Common-channel transmitters 32-2-32-N are of the same configuration as the above-described common-channel transmitter 32-1.

The transmitter of a CDMA base station device further includes a plurality of dedicated-channel transmitters 31-1-31-M. A bit coding process and spreading process that accord with bit rate and data content are carried out for each user in dedicated-channel transmitters 31-1-31-M.

In other words, dedicated-channel data 3011-301M for each user are applied as input to dedicated-channel transmitters 31-1-31-M. For example, in dedicated-channel transmitter 31-1, channel coding unit 311-1 first subjects dedicated-channel data 3011 to a bit coding process that accords with bit rate and data content to convert dedicated-channel data 3011 to a format for wireless transmission. After being converted to the format for wireless transmission, dedicated-channel data 3011 are applied as input to spreader 312-1. Spreader 312-1 spreads the dedicated-channel data supplied from channel coding unit 311-1 by a spreading code whose coding rate accords with the bit rate and supplies the spread data to multiplex/synthesis unit 33.

Although not shown in the figure, dedicated-channel transmitters 31-2-31-M also have the same configuration as dedicated-channel transmitter 31-1 described above and have the same operations as dedicated-channel transmitter 31-1.

Multiplex/synthesis unit 33, based on the power value of each channel, synthesizes the spread data of each of the common channels from common-channel transmitters 32-1-32-N and the spread data of each dedicated channel from dedicated-channel transmitters 31-1-31-M. A designated power value is transmitted from the higher-order station (base station control device) to the CDMA base station device as information indicating the transmission power of each common channel. In the CDMA base station device, the transmission power designated by the higher-order station is applied as input to multiplex/synthesis unit 33. The CDMA base station device decodes the TPC (Transmission Power Control) bits from mobile stations (not shown) to control transmission power for each dedicated channel. A transmission power value that is controlled in this way is applied as input to multiplex/synthesis unit 33.

The higher-order station designates as the transmission power of the common channel a power value that can be received by mobile stations within the range from the vicinity of the base station to the cell boundary. As a result, a mobile station in the vicinity of the base station receives a wireless signal at a power that is greater than necessary for the common channel.

In addition, when a new service such as a MBMS (Multimedia Broadcast Multicast Service) is applied, S-CCPCH is used to execute a Point-to-Multipoint service. In MBMS, a plurality of mobile stations use S-CCPCH to receive the same signal, whereby a service of distributing television images or data can be provided. Because dedicated channels are not used in this case, interference power received by a mobile station from other mobile stations does not change.

However, when a new S-CCPCH dedicated to MBMS is set and the transmission power for the S-CCPCH is set, the total transmission power value of the base station increases, whereby the interference power increases on the mobile station side, and the reception SIR (Signal-to-Interference Ratio) of the dedicated channels decreases. In such a case, mobile stations submit requests to the base station to increase the transmission power of the dedicated channels, whereby the maximum predetermined number of users of dedicated channels in a cell in some cases decreases.

On the other hand, whether mobile stations that wish to use a MBMS are located either in the vicinity of the base station or at the cell boundary, transmission of the S-CCPCH for use in MBMS communication is controlled at the same power regardless of the location of the mobile stations. As a result, when mobile stations that wish to receive MBMS are present only in the vicinity of the base station, the transmission control of the common channel is implemented at a power that is greater than necessary in the cell.

As a technology related to the present invention, a method has been proposed by the inventor of the present application for limiting the transmission power value of common channels that is greater than necessary according to which, when a common channel dedicated for use by a new service such as MBMS has been set, the transmission power of the added common channel is controlled to a low level if mobile stations that receive the service that uses the added common channel are present only in the vicinity of the base station.

Figure 2:
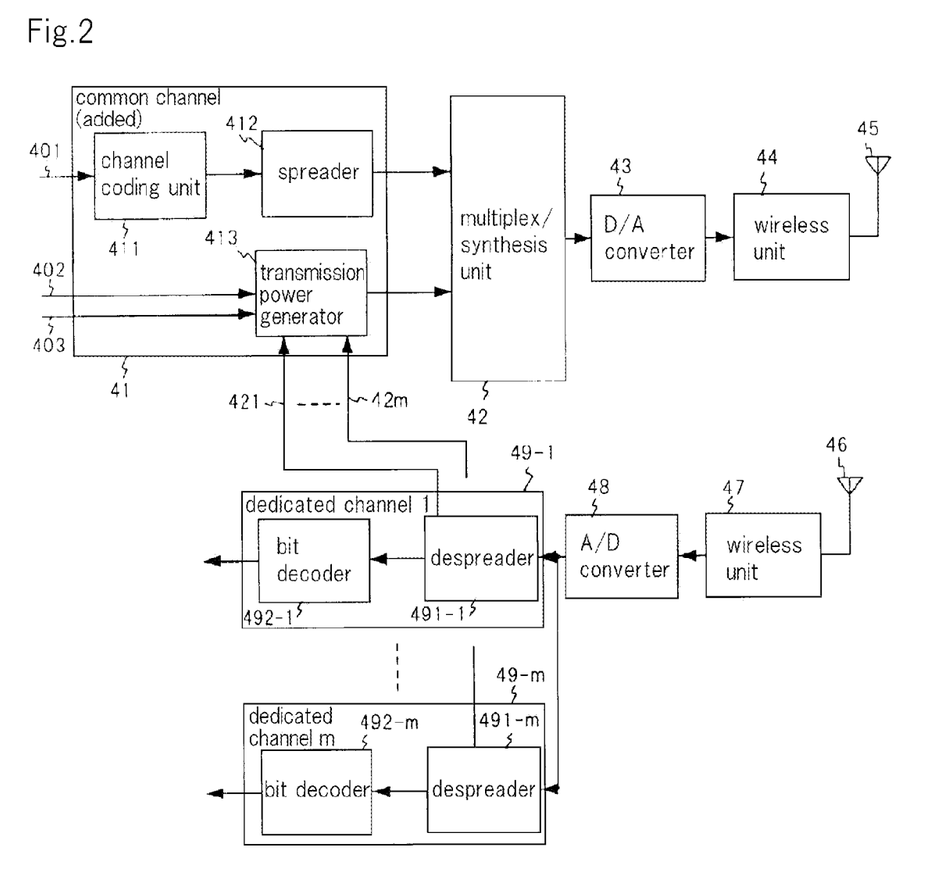
FIG. 2 is a block diagram showing the configuration of the transmitter of a CDMA base station device related to the present invention.

FIG. 2 shows the transmitter of a CDMA base station device in the above-described related art. In FIG. 2, transmission power generator 413, taking transmission power value 403 designated from the higher-order station (not shown) as a reference, uses effective paths 421-42$m$ in dedicated-channel receivers 49-1-49-$m$ to detect users at the most remote effective-path positions among the dedicated channels that are using a common channel that has been added.

Dedicated-channel receiver 49-1 includes despreader 491-1 and bit decoder 492-1. Dedicated-channel receivers 49-2-49-*m* also have the same configuration as dedicated-channel receiver 49-1 and include despreaders 491-2-491-*m* and bit decoders 492-2-492-*m*. Each of despreaders 491-1-491-*m* receives the output of A/D converter 48. The input of A/D converter 48 is connected to antenna 46 by way of wireless unit 47.

Transmission power generator 413 determines whether to alter the transmission power of common channels that are added based on the effective-path positions of users that were detected and supplies the common channel transmission power value following the determination to multiplex/synthesis unit 42. The output of multiplex/synthesis unit 42 is supplied to antenna 45 by way of a D/A converter and wireless unit 44.

According to the above-described related art, the effective-path search positions of dedicated channels that are being used at the time of addition are monitored, and when mobile stations that receive a service that uses an added common channel are present only in the vicinity of the base station, the transmission power of the added common channel is reduced to enable a limitation of common channel power transmission that is greater than necessary.

Transmission power control that is related to the present invention includes the art disclosed in JP-A-2004-215305 (Patent Document 1) and JP-A-2004-201095 (Patent Document 2).

DISCLOSURE OF THE INVENTION

In a CDMA mobile communication system, a higher-order station designates, as the common channel transmission power, a power value which mobile stations, within the range from the vicinity of the base station to the cell boundary, can receive. Accordingly, mobile stations in the vicinity of the base station receive a wireless signal at a power that is greater than necessary for the common channel.

In addition, when a new service such as MBMS is applied, S-CCPCH is used in the case of MBMS and a Point-to-Multipoint service is thus utilized. In MBMS, a plurality of mobile stations receive the same data by using S-CCPCH, whereby a service of, for example, distributing television images and data can be received, and because dedicated channels are not used, the amount of interference received by the mobile stations from other mobile stations does not change compared to a case in which MBMS is absent.

However, when a new S-CCPCH dedicated to MBMS is set, the increase in the transmission power value of the base station results in a decrease in the SIR value of dedicated channels in mobile stations, whereby a request is made to the base station to increases the transmission power of each dedicated channel, resulting in the danger that the maximum required number of users of dedicated channels in a cell may decrease.

In addition, even with a control method for, when a common channel has been set dedicated for the use of a new service such as MBMS and when mobile stations that are to receive the service that uses the added common channel are present only in the vicinity of the base station, effecting control to reduce the transmission power of the added common channel and thus limit a common channel transmission power value that is greater than necessary, the problem remains in which, after the transmission power of the added common channel has been reduced in a state in which mobile stations that are to receive a service that uses an added common channel are present only in the vicinity of the base station, a mobile station in the vicinity of the cell boundary newly attempts to receive the common channel and is unable to receive, or in which the common channel transmission power must be transmitted such that even a mobile station in the vicinity of the cell boundary can receive. Disclosures of the previously noted Patent Documents 1 and 2 do not enable solutions to these problems.

It is an object of the present invention to provide a mobile communication system, a common channel transmission control device, and a common channel transmission control method used in the system and device that enable a suppression of a common channel transmission power value that is greater than necessary and that can solve the above-described problems.

The mobile communication system according to the present invention is a mobile communication system in which the number of common channels is increased by the offering of a new service, the mobile communication system being provided with, assuming that a plurality of common channels can be arranged to transmit the same data:

a monitor means for using reception path search results of any of dedicated channels and random access channels of mobile stations to monitor the communication state of mobile stations in a cell; and a control means for implementing control such that the communication range permitted by the plurality of common channels is divided and used according to the distribution within the cell of mobile stations that receive the new service that is obtained from monitor results realized by the monitor means.

The common channel transmission control device according to the present invention includes the monitor means and control means described in the above-described mobile communication system.

The common channel transmission control method according to the present invention is a common channel transmission control means used in a mobile communication system in which the number of common channels is increased by the offering of a new service; the common channel transmission control method including, assuming a plurality of the common channels can be arranged to transmit the same data:

a monitor process of using reception path search results of either random access channels or dedicated channels of mobile stations to monitor the communication state of mobile stations in a cell; and a control process of effecting control such that the communication range permitted by the plurality of common channels is divided and used according to the distribution within a cell of mobile stations that receive the new service that is obtained from the monitor results of the monitor process.

According to the present invention, the adoption of the above-described configuration and operation obtains the effect of enabling a limitation of a common channel transmission power value that is greater than necessary.

EXPLANATION OF REFERENCE NUMBERS 11 transmission control unit
11a memory
11b added common-channel transmission power setting unit
11c determination unit
11d effective-path determination unit
11e dedicated-channel transmission frequency control unit
12 first added common-channel transmitter
13, 18 multiplex/synthesis unit
14, 19 D/A converter
15, 20, 24 wireless unit
16, 21 transmission antenna
17 second added common-channel transmitter
22 dedicated-channel transmitter
23 reception antenna
25 ND converter
26-1-26-m dedicated-channel (1-m) receiver
121, 171, 221 channel coding unit
122, 172, 222 spreader
223 frequency setting unit
261-1-261-m despreader
262-1-262-m bit decoder

BEST MODE FOR CARRYING OUT THE INVENTION

Explanation next regards exemplary embodiments of the present invention with reference to the accompanying figures.

Figure 3:
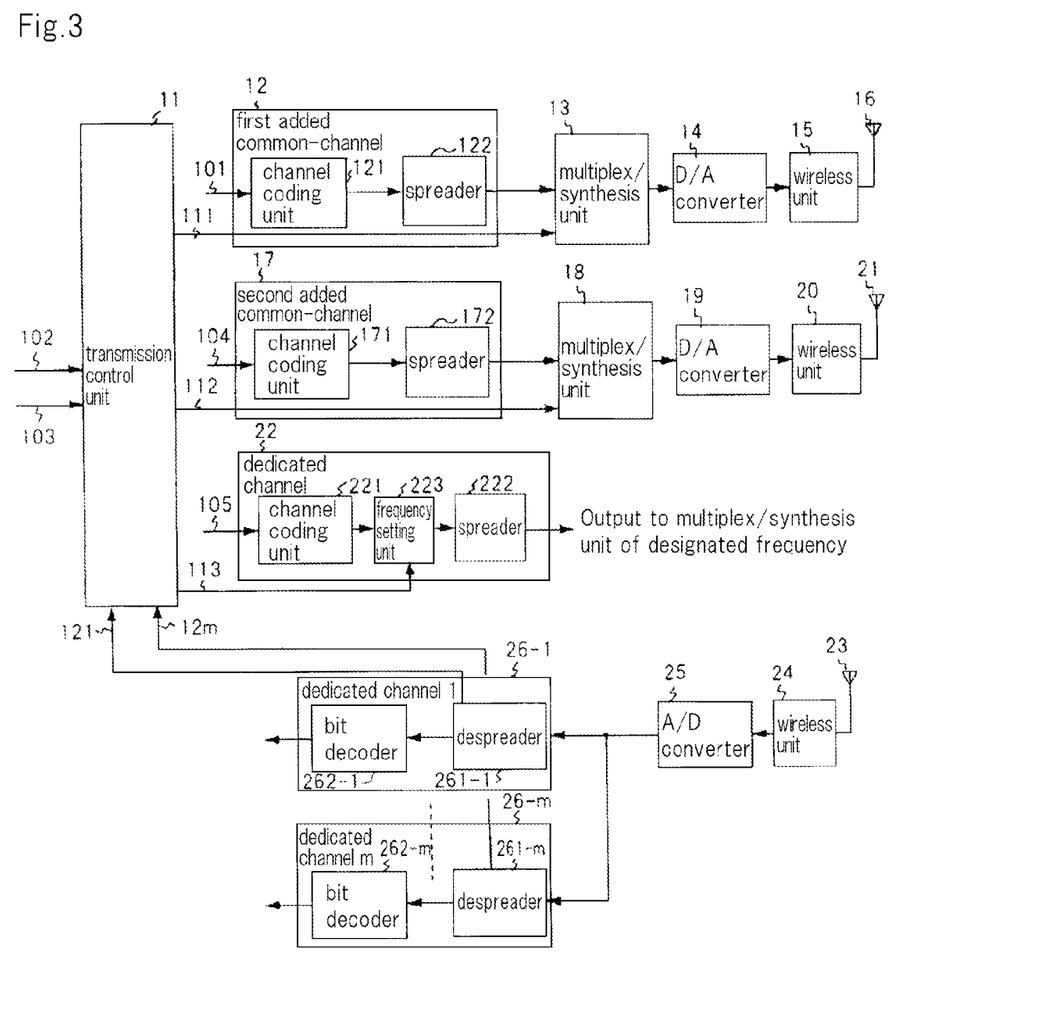
FIG. 3 is a block diagram showing an example of the configuration of the CDMA base station device according to an exemplary embodiment of the present invention.

FIG. 3 is a block diagram showing the configuration of a CDMA (Code Division Multiple Access) base station device (common-channel transmission control device) according to an exemplary embodiment of the present invention. FIG. 3 shows the configuration relating to control of the transmission of a common channel that has been added (hereinbelow referred to as an "added common channel") in the CDMA base station device of the present embodiment.

The CDMA base station device of the present embodiment includes: transmission control unit 11, first added common-channel transmitter 12, multiplex/synthesis units 13 and 18, D/A (digital/analog) converters 14 and 19, wireless units 15, 20, and 24, transmission antennas 16 and 21, second added common-channel transmitter 17, dedicated-channel transmitter 22, reception antenna 23, A/D (analog/digital) converter 25, and dedicated-channel (1-m) receivers 26-1-26-m.

First added common-channel transmitter 12 is composed of channel coding unit 121 and spreader 122. Second added common-channel transmitter 17 is composed of channel coding unit 171 and spreader 172. Dedicated-channel transmitter 22 is composed of channel coding unit 221, spreader 222, and frequency setting unit 223.

Dedicated-channel (1-m) receiver 26-1 is composed of despreader 261-1 and bit decoder 262-1. Dedicated-channel (1-m) receivers 26-2-26-m have the same configuration as dedicated-channel (1-m) receiver 26-1, and include despreaders 261-2-261-m and bit decoders 262-2-262-m.

Added common-channel data 101 such as MBMS is transmitted from a higher-order station (base station control device) (not shown) to the CDMA base station device. In the CDMA base station device, added common-channel data 101 from the higher-order station is applied as input to common-channel transmitter 12. In common-channel transmitter 12, channel coding unit 121 first subjects added common-channel data 101 to a bit coding process according to the bit rate and data content to convert added common-channel data 101 to a format for wireless transmission. The added common-channel data whose format has been converted are then applied as input to spreader 122. Spreader 122 spreads the added common-channel data whose format was converted at a spreading code whose coding rate accords with the bit rate. The spread data are then supplied to multiplex/synthesis unit 33.

Multiplex/synthesis unit 33 also receives as input other common channels (not shown) such as CPICH (Common Pilot Channel) or P-CCPCH (Primary-Common Control Physical Channel) and the spread data of each dedicated channel (not shown). Multiplex/synthesis unit 33 carries out multiplexing and synthesizing based on the transmission power value.

Regarding the transmission power of other common channels (not shown), a power value designated from the higher-order station is transmitted to the CDMA base station device from the higher-order station. On the other hand, the transmission power of the added common channels is controlled by the following construction using transmission control unit 11.

Transmission control unit 11 receives as input: transmission power value 102 designated from the higher-order station, information 103 of mobile stations that are using the added common channels, and effective-path information 121-12m of the path search results in dedicated-channel receivers 26-1-26-m.

Transmission control unit 11 detects the number of dedicated channels that are using the added common channels and the number of dedicated channels for which the effective-path positions of the dedicated channels are equal to or greater than an arbitrary threshold value. In this way, transmission control unit 11: acquires information of the number of mobile stations that are using the added common channel and the number of mobile stations located far from the base station that are using the added common channel, effects control of the transmission power according to the acquired results, and supplies the power value following control to multiplex/synthesis unit 13 in signal 111. The output of multiplex/synthesis unit 13 is D/A-converted in D/A (digital/analog) converter 14 and then transmitted from transmission antenna 16 by way of wireless unit 15.

When a state is detected in transmission control unit 11 in which the number of dedicated channels that are using the added common channels is equal to or greater than a fixed number, and moreover, the number of dedicated channels for which the effective-path positions are equal to or greater than an arbitrary threshold value is extremely low, transmission control unit 11 reduces the transmission power to common-channel transmitter 12, and further, enables transmission from a new common-channel transmitter 17 at a different frequency than common-channel transmitter 12.

As a result, in channel coding unit 171 in common-channel transmitter 17, a bit coding process according to the same data content as common-channel transmitter 12 is carried out upon added common-channel data 104 supplied from the higher-order station, and the process of converting data to the format for wireless transmission is also carried out. The data that have been converted to the format for wireless transmission is applied as input to spreader 172. Spreader 172 spreads the data that have been converted to the format for wireless transmission by a spread code of a coding rate that accords with the bit rate and supplies the spread data to multiplex/synthesis unit 18.

Transmission control unit 11 further sets the transmission power value in signal 112 and supplies this power value to multiplex/synthesis unit 18. The output of multiplex/synthesis unit 18 is D/A-converted in D/A converter 19 and then transmitted from transmission antenna 21 by way of wireless unit 20.

In dedicated-channel transmitter 22, in the case of a mobile station that has switched to communicate by a new common channel have a different frequency, a frequency switching setting is carried out in frequency setting unit 223 based on signal 113 from transmission control unit 11. In dedicated-channel transmitter 22, the output data of spreader 222 are applied as input to a multiplex/synthesis unit (not shown) whose frequency was altered.

The frequency switching of dedicated-channel transmitter 22 can be carried out at the same time as the frequency switching of the added common channel and can be executed by a known in-cell different-frequency handover operation, and a presentation of the configuration in figures and an explanation of its operation are therefore here omitted.

In the present exemplary embodiment, a configuration is adopted that uses dedicated channels to utilize the path search results of dedicated-channel receivers 26-1-26-m as a means for obtaining positional information of mobile stations that use the added common channel, but when a mobile station that uses the added common channel is not using a dedicated channel, the effective-path information of the random-access channel of the mobile station may be used.

Transmission control unit 11 of the present exemplary embodiment may be provided in either the base station device or the base station control device.

Figure 4:
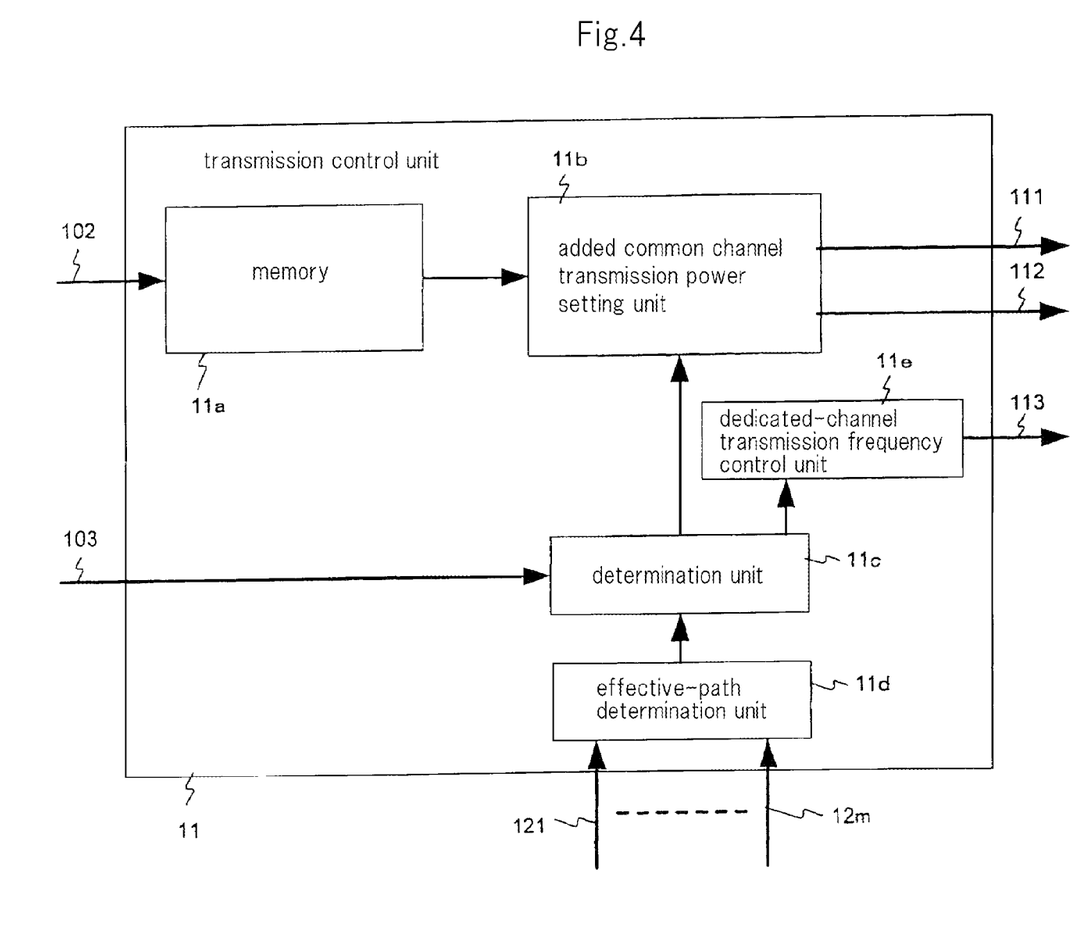
FIG. 4 is a block diagram showing an example of the configuration of the transmission control unit of FIG. 3.

FIG. 4 is a block diagram showing an example of the configuration of transmission control unit 11 of FIG. 3. In FIG. 4, transmission control unit 11 is made up of: memory 11a, added common-channel transmission power setting unit 11b, determination unit 11c, effective-path determination unit 11d, and dedicated-channel transmission frequency control unit 11e.

Figure 5:
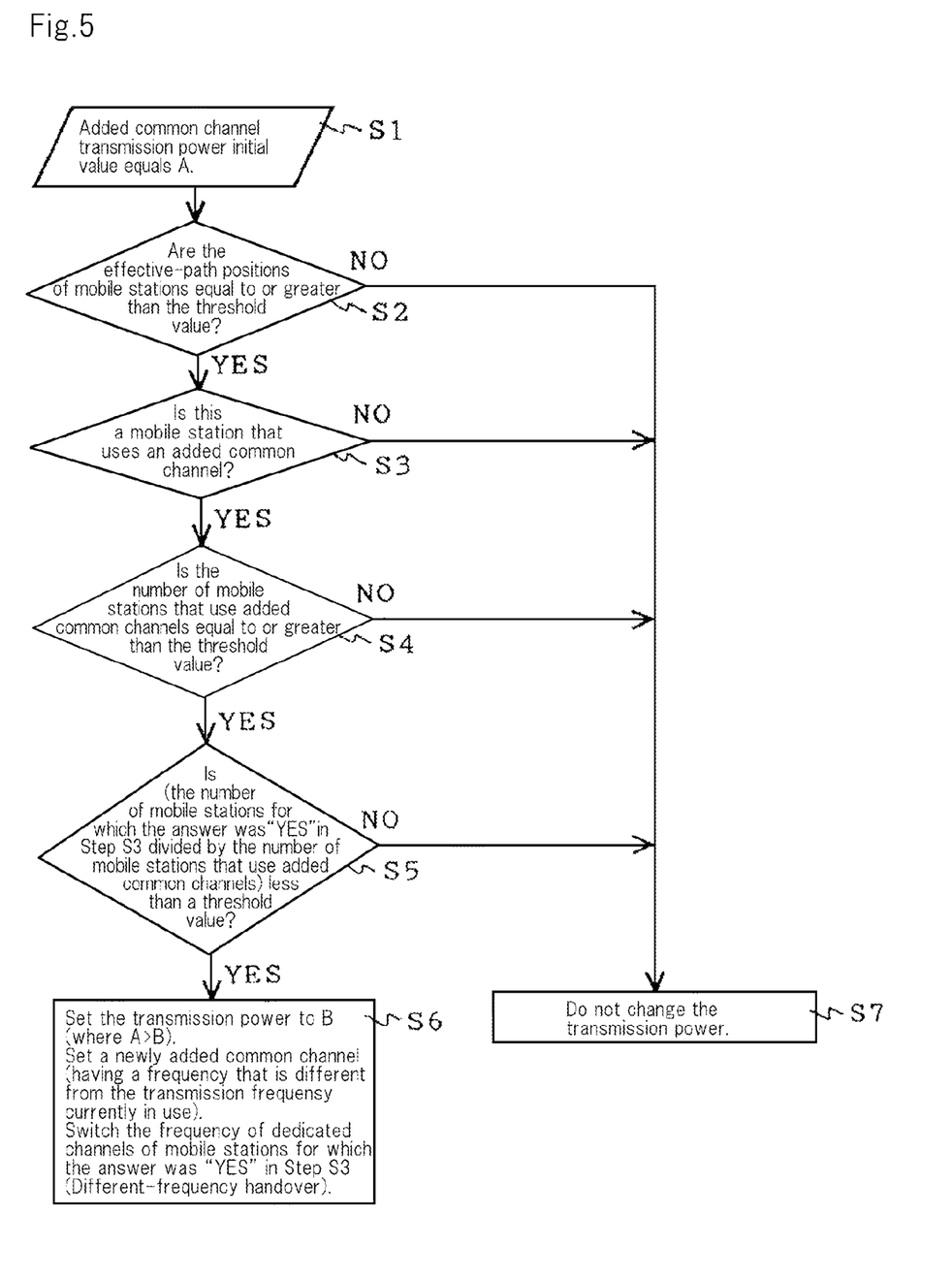
FIG. 5 is a flow chart showing the operation of the transmission control unit of FIG. 3.

FIG. 5 is a flow chart showing the operations of transmission control unit 11 of FIG. 3. The operation of transmission control unit 11 according to an exemplary embodiment of the present invention is next explained while referring to FIG. 3 to FIG. 5.

Transmission power A of added common channels that is set from the higher-order station is applied as input to memory 11a (Step S1 in FIG. 5). Effective-path determination unit 11d supplies determination unit 11c with path delay information that is greater than an arbitrary threshold value from among effective-path positional information 121-12m, which is the path search results supplied from dedicated-channel receivers 26-1-26-m (Step S2 of FIG. 5).

Regarding path delay information in which the effective-path position is greater than an arbitrary threshold value, determination unit 11c determines whether the path delay information corresponds to the information of mobile stations which employ added common channels that are received as input from signal 103 (Step S3 of FIG. 5).

If the number of the corresponding mobile stations, with respect to the number of mobile stations that are using the added common channel, is less than a threshold value that has been set in advance (Steps S4 and S5 of FIG. 5), determination unit 11c newly adds an added common channel that has a different frequency, and moreover, sets added common channel transmission power setting unit 11b such that the transmission power of the current added common channels is reduced (Step S6 of FIG. 5).

Added common-channel transmission power setting unit 11b determines the transmission power value of the added common channel based on the input results from determination unit 11c, and transmits the transmission power value to each of the added common channels in signal 111 and signal 112.

On the other hand, if in determination unit 11c the number of relevant mobile stations is less than the threshold value that has been set in advance, an added common channel that has a different frequency is newly added, whereby a signal indicating frequency switching is transmitted from determination unit 11c to dedicated-channel transmission frequency control unit 11e for dedicated channels having the path delay information that was applied as input to determination unit 11c.

Dedicated-channel transmission frequency control unit 11e sets dedicated-channel transmitter 22 to change the transmission frequency to the relevant dedicated channels in signal 113. Although transmission to dedicated-channel transmitter 22 is performed in dedicated-channel transmission frequency control unit 11e, when a plurality of dedicated channels must be subjected to frequency change according to the determination results of determination unit 11c, frequency change is set from dedicated-channel transmission frequency control unit 11e to the plurality of relevant dedicated-channel transmitters (not shown).

Thus, according the present exemplary embodiment, when in a common channel that is added in a new service, such as a MBMS (Multimedia Broadcast Multicast Service), a multiplicity of mobile stations that receive the service that uses the added common channel are present in the vicinity of the base station and when only a few mobile stations are present in the vicinity of the cell boundary, transmission control unit 11 effects switching such that a common channel having a different frequency is set for the dedicated use of communication for the few mobile station present in the vicinity of the cell boundary and effects control to decrease the transmission power of the added common channel, and thereby can suppress a common channel transmission power value that is greater than necessary.

In the present exemplary embodiment, moreover, the adoption of the above-described configurations enables configuration by altering the circuits of the base station device or the base station control device, and the effect of not increasing changing circuits and arithmetic processes on the mobile station side can be obtained.

In the present exemplary embodiment, moreover, adopting as input effective-path information that is realized by a path search of dedicated channels having a plurality of frequencies in a cell in transmission control unit 11 allows the above-described operation to be realized even when a configuration is adopted in which a number of mobile stations having a plurality of frequencies are controlled together.

As described hereinabove, according to the present invention, a system can be constructed in which, when the number of common channels is increased due to the provision of a new service such as MBMS in a CDMA mobile communication system, assuming that a plurality of common channels are prepared for transmitting the same data, when the monitoring of the state of communication of mobile stations in a cell by using the reception path search results of the dedicated channels or random access channels of mobile stations in a base station or base station control device indicates a state in which the distribution of mobile stations within the cell that receive the MBMS service is unbalanced, dividing the use of the communication range permitted by the plurality of common channels prevents the generation of more common channel transmission power than is necessary. In this case, the required capacity of mobile stations within the cell need not be reduced to the minimum.

In other words, the transmission control unit of the present invention: receives as input a transmission power value that is designated from a higher-order station, information of mobile stations that are using added common channels, and effective-path positional information of path search results in dedicated-channel receivers; and upon detecting a state in which the number of dedicated channels that use the added common channel is greater than a fixed number, and moreover, in which the number of dedicated-channels for which the effective-path position is equal to or greater than an arbitrary threshold value is extremely low, reduces the transmission power to the common-channel transmitter; and moreover, enables transmission from a new common-channel transmitter at a frequency that is different from the common-channel transmitter.

Thus, in the present invention, when a multiplicity of mobile stations that receive a service that uses an added common channel are present in the vicinity of the base station, and moreover, when only a few mobile stations that receive the service are present in the vicinity of the cell boundary, switching to communicate by a common channel that has a different frequency for transmitting the same data to the mobile stations present in the vicinity of the cell boundary and decreasing the transmission power of the common channel to a level that enables adequate reception for mobile stations that are present in the vicinity of the base station enables limitation of common-channel power transmission that is greater than necessary.

In the present invention, a transmission control unit is provided that, in common channels that are added by a new service such as MBMS, uses the effective-path state of path search positions of dedicated channels that are being used at the time of the addition to monitor the total number of dedicated channels and the reception positions in the cell, and when the mobile stations that receive the service that uses the added common channel are concentrated in the vicinity of the base station and when only a few mobile station are present in the vicinity of the cell boundary, newly prepares a common channel having a different transmission frequency, implements switching to realize communication to mobile stations that are present in the vicinity of the cell boundary with the common channel of the newly added transmission frequency, and moreover, implements control to decrease the transmission power of the currently communicating common channel. In this way, the present invention enables a limitation of a common channel transmission power value that is greater than necessary when a multiplicity of mobile stations that receive a service that uses an added common channel are present in the vicinity of the base station and when only a few mobile stations are present in the vicinity of the cell boundary.

In the present invention, a plurality of common channels for transmitting the same data are prepared, the transmission frequencies of each of the common channels are divided and transmission is carried out, and even when the traffic of mobile stations that wish to receive MBMS service indicates an unbalanced distribution state in the cell, dividing and using the communication range permitted by the plurality of common channels can prevent the generation of common-channel transmission power that is greater than necessary.

The present invention can be used in a CDMA mobile communication system having a base station that can transmit a plurality of frequencies.

The present invention was described hereinabove with reference to an embodiment, but the present invention is not limited to the above-described embodiment. The configuration and operation of the present invention is open to various modifications within a scope that does not depart from the gist of the present invention and that would be readily understood by any one having ordinary skill in the art.

According to one aspect of the present invention, a mobile communication system in which the number of common channels is increased due to the provision of a new service includes: assuming that a plurality of the common channels can be arranged to transmit the same data, a monitor means for using reception path search results of any of the dedicated channels and random access channels of mobile stations to monitor the communication state of mobile stations within a cell; and a control means for effecting control such that the communication range permitted by the plurality of common channels is divided and used according to the distribution within the cell of mobile stations that receive the new service that is obtained from the monitor results realized by the monitor means. Here, the monitor means corresponds to effective-path determination unit 11$d$ of FIG. 4, and the control means corresponds to determination unit 11$c$ of FIG. 4.

In the above-described mobile communication system: the monitor means, in a common channels that is added by a new service, may use the state of effective paths of path search positions of dedicated channels that are being used at the time of the addition to monitor the total number of dedicated channels and the reception positions in the cell; and the control means, upon determining by means of the monitor results that mobile stations that receive the service that uses the common channel that was added are concentrated in the vicinity of the base station, may newly prepare a common channel that has a different transmission frequency and implement switching such that mobile stations present in the vicinity of the cell boundary communicate with the common channel of the newly added transmission frequency.

The above-described control means may implement control to reduce the transmission power of the currently communicating common channels.

Still further, when the monitor means detects a state in which the number of dedicated channels that are using a common channel that was added due to the new service is equal to or greater than a fixed number, and moreover, when the number of dedicated channels for which the effective-path positions are equal to or greater than an arbitrary threshold value is extremely low, the control means may implement control to reduce the transmission power of the common channel that is currently communicating and enable transmission on the common channel of the newly added transmission frequency.

The control means may take as input effective-path information realized by a path search of dedicated channels having a plurality of frequencies in the cell and may control the number of mobile stations having the plurality of frequencies as a group.

The monitor means and the control means may be installed in either a base station device or a base station control device.

The service described above may include at least a MBMS (Multimedia Broadcast Multicast Service) service.

According to another aspect of the present invention, a common channel transmission control device includes the above-described monitor means and the control means.

This application is the National Phase of PCT/JP2008/069007, filed on Oct. 21, 2008, which claims priority based on JP-A-2007-275865 for which application was submitted on Oct. 24, 2007 and incorporates all of the disclosures of that application.

What is claimed is:

1. A mobile communication system in which a plurality of common channels are added by offering a new service, comprising: the plurality of said common channels configured to transmit same data; a monitor unit that uses reception path search results of any of dedicated channels and random access channels of mobile stations to monitor the communication state of the mobile stations in a cell: and a control unit that determines, based on monitored results realized by said monitor unit, a state in which a distribution of the mobile stations within the cell that receives said new service is unbalanced to implement control such that a communication range permitted by said plurality of common channels is divided and used, wherein: said monitor unit, in the common channels that are added by said new service, uses the state of effective paths of path search positions of the dedicated channels that are being used at a time of the addition to monitor a total number of the dedicated channels and reception positions in the cell; and said control unit, when it is determined based on the monitor results that the mobile stations that receive said new service that uses the added common channels are concentrated in the vicinity of a base station, prepares a new common channel from the plurality of the added common channels having different transmission frequency and effects switching such that the mobile stations present in the vicinity of the cell boundary communicate with the new common channel having the different transmission frequency; wherein said monitor unit and said control unit are coupled to a memory.

2. The mobile communication system according to claim 1, wherein said control unit effects control such that transmission power of currently transmitting the added common channels is reduced.

3. The mobile communication system according to claim 2, wherein said control unit, when said monitor unit detects a state in which the number of dedicated channels that use the added common channels to said new service is equal to or greater than a fixed number, and wherein, when the total number of dedicated channels for which the effective-paths of said path search positions are equal to or greater than a threshold value is extremely low, effects the control such that the transmission power of said currently transmitting the added common channels is reduced and said control unit enables transmission on the new common channel of the different transmission frequency.

4. The mobile communication system according to claim 1, wherein said control unit takes as input effective-path information realized by a path search of the dedicated channels having a plurality of frequencies in the cell and controls a number of the mobile stations having the plurality of frequencies as a group.

5. The mobile communication system according to claim 1, wherein said monitor unit and said control unit are embedded within either a base station device or a base station control device.

6. The mobile communication system according to claim 1, wherein said service includes at least a MBMS (Multimedia Broadcast Multicast Service) service.

7. A common channel transmission control device that includes the monitor unit and the control unit according to claim 1.

8. A common channel transmission control method used in a mobile communication system in which a plurality of common channels are added by offering a new service; said common channel transmission control method comprising: the plurality of said common channels configured to transmit same data; a monitor process of using reception path search results of either dedicated channels or random access channels of mobile stations to monitor the communication state of the mobile stations in a cell: and a control process that determines, based on monitored results realized by said monitor process, a state in which a distribution of the mobile stations within the cell that receives said new service is unbalanced to implement control such that a communication range permitted by said plurality of common channels is divided and used, wherein: in said monitor process, in the common channels added due to said new service, the state of effective paths of path search positions of the dedicated channels that are being used at a time is used to monitor a total number of the dedicated channels and the reception positions within the cell; and in said control process, when it is determined based on the monitor results that the mobile stations that receive said new service that uses the common channels that are added are concentrated in the vicinity of a base station, prepares a new common channel from the plurality of the added common channels having a different transmission frequency , and switching is effected such that the mobile stations present in the vicinity of the cell boundary communicate with the new common channel having the different transmission frequency.

9. The common channel transmission control method according to claim 8, wherein, in said control process, control is effected such that transmission power of currently communicating the added common channels is reduced.

10. The common channel transmission control method according to claim 9, wherein, in said control process, when it is detected in said monitor process that the total number of the dedicated channels that are using the added common channels to said new service is equal to or greater than a fixed number, and wherein, when, the total number of the dedicated channels for which the effective-paths of said path search positions are equal to or greater than a threshold value is extremely low, the control is effected such that the transmission power of said added common channels that are currently communicating is reduced and the transmission on the new common channel of the different transmission frequency is enabled.

11. The common channel transmission control method according to claim 8, wherein, in said control process, effective-path information realized by a path search of the dedicated channels having a plurality of frequencies in the cell is taken as input, and a number of the mobile stations having the plurality of frequencies are controlled as a group.

12. The common channel transmission control method according to claim 8, wherein said monitor process and said control process are executed in either a base station device or a base station control device.

13. The common channel transmission control method according to claim 8, wherein said service includes at least a MBMS (Multimedia Broadcast Multicast Service) service.

* * * * *